(12) United States Patent
Salamone et al.

(10) Patent No.: US 7,495,061 B2
(45) Date of Patent: Feb. 24, 2009

(54) HIGH REFRACTIVE-INDEX, HYDROPHILIC MONOMERS AND POLYMERS, AND OPHTHALMIC DEVICES COMPRISING SUCH POLYMERS

(75) Inventors: Joseph C. Salamone, Fairport, NY (US); Jay F. Kunzler, Canandaigua, NY (US); Richard M. Ozark, Solvay, NY (US)

(73) Assignee: Bausch + Lomb Incorporated, Rochester, NY (US)

( * ) Notice: Subject to any disclaimer, the term of this patent is extended or adjusted under 35 U.S.C. 154(b) by 563 days.

(21) Appl. No.: 11/139,276

(22) Filed: May 27, 2005

(65) Prior Publication Data

US 2006/0270749 A1 Nov. 30, 2006

(51) Int. Cl.
*C08F 12/24* (2006.01)
*C08F 118/16* (2006.01)
*C08F 12/02* (2006.01)
*C08F 18/00* (2006.01)
*C08F 2/46* (2006.01)

(52) U.S. Cl. ............... 526/313; 526/326; 526/346; 526/292.3; 526/292.5; 522/188

(58) Field of Classification Search ............. 522/188; 526/313, 326, 346, 292.3, 292.5
See application file for complete search history.

(56) References Cited

U.S. PATENT DOCUMENTS

| | | | |
|---|---|---|---|
| 4,304,895 A | 12/1981 | Loshaek | |
| 4,528,311 A | 7/1985 | Beard et al. | |
| 5,674,960 A | 10/1997 | Namdaran et al. | |
| 5,693,095 A | 12/1997 | Freeman et al. | |
| 5,861,031 A | 1/1999 | Namdaran et al. | |
| 5,891,931 A | 4/1999 | LeBoeuf et al. | |
| 5,922,821 A * | 7/1999 | LeBoeuf et al. ............. | 526/286 |
| 6,015,842 A | 1/2000 | LeBoeuf et al. | |
| 6,313,187 B2 | 11/2001 | LeBoeuf et al. | |
| 6,353,069 B1 | 3/2002 | Freeman et al. | |
| 6,541,572 B2 | 4/2003 | LeBoeuf | |
| 6,632,905 B2 | 10/2003 | LeBoeuf | |
| 6,635,732 B2 | 10/2003 | Mentak | |
| 6,673,886 B2 | 1/2004 | Vanderbilt | |
| 6,689,853 B2 | 2/2004 | Campbell et al. | |
| 6,695,880 B1 | 2/2004 | Roffman et al. | |
| 6,703,466 B1 * | 3/2004 | Karakelle et al. ............. | 526/259 |
| 6,723,815 B2 | 4/2004 | Callaghan et al. | |
| 6,737,448 B2 | 5/2004 | Liao | |
| 6,767,934 B1 | 7/2004 | Hodd et al. | |
| 6,767,979 B1 | 7/2004 | Muir et al. | |
| 6,776,932 B1 | 8/2004 | Ilyashenko | |
| 6,852,793 B2 | 2/2005 | Salamone et al. | |
| 6,852,820 B2 | 2/2005 | Mentak | |

FOREIGN PATENT DOCUMENTS

| | | |
|---|---|---|
| JP | 09-165422 A | 6/1997 |
| WO | WO 9924382 A1 * | 5/1999 |
| WO | WO 99/52570 A | 10/1999 |
| WO | WO 99/53348 A | 10/1999 |

OTHER PUBLICATIONS

International Search Report (PCT/ISA/210) and Written Opinion (PCT/ISA/237) mailed on Nov. 23, 2006.
P. Yates et al, Tandem wessely oxidation and intramolecular Diels-Alder reactions, Can.J.Chem, vol. 66, No. 1, 1988, pp. 1-10.
H. Ohigashi et al, Chavicol, as a Larva-growth Inhibitor, from Viburnum japonicum Spreng, Agr.Biol.Chem., vol. 40, No. 11, 1976, pp. 2283-2287.
K. Uneyama et al, Synthesis of 4-(4-Hydroxy-2,6-dimethylphenyl)-1,2-butanediol and 4-(4-hydroxy-2,6-dimethylphenyl)-2-butanol, Bulletin of the Chemical Society of Japan, vol. 49, No. 9, 1976, pp. 2649-2650.
A.L. Meyers et al, Nucleophilic Annulations of Aromatics, J.Org. Chem., vol. 46, 1981, pp. 783-788.
Schlosser M. et al, About the Physiological Size of Fluorine Substituents: Comparison of Sensorially Active Compounds with Fluorine and Methyl Substituted Analogues, Jan. 1996, Tetrahedron Elsevier Science Publishers, Amsterdam, NL, pp. 99-108.
A. Sen et al, Possible Antimoebic Agents, Journ.Indian.Chem.Soc., vol. 35, No. 8, 1958, pp. 613-615.
N.S. Narasimhan et al, Synthetic Applications of Lithiation Reactions, Indian.J.Chem., vol. 7, 1969, pp. 536-537.

* cited by examiner

*Primary Examiner*—Randy Gulakowski
*Assistant Examiner*—Michael M Bernshteyn
(74) *Attorney, Agent, or Firm*—Joseph Barrera

(57) ABSTRACT

A hydrophilic, aromatic-based monomer has an aromatic group substituted with at least one hydrophilic substituent and a reactive functional group. Polymers comprising such a hydrophilic, aromatic-based monomers avoid or reduce the risk of forming vacuoles of absorbed water. Furthermore, such polymers have high refractive index, and, thus, are advantageously used for making ophthalmic devices, such as intraocular lenses, contact lenses, corneal rings, corneal inlays, and keratoprostheses.

16 Claims, No Drawings

HIGH REFRACTIVE-INDEX, HYDROPHILIC MONOMERS AND POLYMERS, AND OPHTHALMIC DEVICES COMPRISING SUCH POLYMERS

BACKGROUND OF THE INVENTION

The present invention relates to high refractive-index, hydrophilic monomers and polymers, and ophthalmic devices comprising such polymers. In particular, the present invention relates to high refractive-index, aromatic-based, hydrophilic monomers and polymers, and ophthalmic devices comprising such polymers.

Since the 1940s ophthalmic devices in the form of intraocular lens ("IOL") implants have been utilized as replacements for diseased or damaged natural ocular lenses. In most cases, an intraocular lens is implanted within an eye at the time of surgically removing the diseased or damaged natural lens, such as for example, in the case of cataracts. For decades, the preferred material for fabricating such intraocular lens implants was poly(methyl methacrylate), which is a rigid, glassy polymer.

Softer, more flexible IOL implants have gained in popularity in more recent years due to their ability to be compressed, folded, rolled or otherwise deformed. Such softer IOL implants may be deformed prior to insertion thereof through an incision in the cornea of an eye. Following insertion of the IOL in an eye, the IOL returns to its original pre-deformed shape due to the memory characteristics of the soft material. Softer, more flexible IOL implants as just described may be implanted into an eye through an incision that is much smaller, i.e., less than 4.0 mm, than that necessary for more rigid IOLs, i.e., 5.5 to 7.0 mm. A larger incision is necessary for more rigid IOL implants because the lens must be inserted through an incision in the cornea slightly larger than the diameter of the inflexible IOL optic portion. Accordingly, more rigid IOL implants have become less popular in the market since larger incisions have been found to be associated with an increased incidence of postoperative complications, such as induced astigmatism.

With recent advances in small-incision cataract surgery, increased emphasis has been placed on developing soft, foldable materials suitable for use in artificial IOL implants. In general, the materials of current commercial IOLs fall into one of three general categories: silicones, hydrophilic acrylics and hydrophobic acrylics.

In general, high water content hydrophilic acrylics, or "hydrogels," have relatively low refractive indices, making them less desirable than other materials with respect to minimal incision size. Low refractive-index materials require a thicker IOL optic portion to achieve a given refractive power. Silicone materials may have a higher refractive index than high-water content hydrogels, but tend to unfold explosively after being placed in the eye in a folded position. Explosive unfolding can potentially damage the corneal endothelium and/or rupture the natural lens capsule and associated zonules. Low glass-transition-temperature hydrophobic acrylic materials are desirable because they typically have a high refractive index and unfold more slowly and more controllably than silicone materials. Unfortunately, low glass-transition-temperature hydrophobic acrylic materials, which contain little or no water initially, tend to absorb water over time and form pockets of water or vacuoles in vivo, causing light reflections or "glistenings." Furthermore, it may be difficult to achieve ideal folding and unfolding characteristics due to the temperature sensitivity of some acrylic polymers.

Because of the noted shortcomings of current polymeric materials available for use in the manufacture of ophthalmic implants, there is a need for stable, biocompatible polymeric materials having desirable physical characteristics and refractive indices.

SUMMARY OF THE INVENTION

In general, the present invention provides hydrophilic monomers having high refractive indices and polymeric compositions comprising such monomers.

In one aspect, the present invention provides hydrophilic, aromatic-based monomers and polymeric compositions comprising such monomers.

In another aspect, a hydrophilic, aromatic-based monomer of the present invention has a formula of

G-D-Ar              (I)

wherein Ar is a $C_6$-$C_{24}$ aromatic group having at least a hydrophilic substituent, D is a divalent linking group, and G is a reactive functional group.

In still another aspect, a polymeric composition comprises a copolymer of at least two hydrophilic, aromatic-based monomers of the present invention or a copolymer of an aromatic-based monomer of the present invention and at least one other monomer.

In still another aspect, said at least one other monomer is selected from hydrophilic monomers, hydrophobic monomers, and combinations thereof.

In yet another aspect, the present invention provides a method of making a high refractive index hydrophilic monomer. The method comprises providing a $C_6$-$C_{24}$ aromatic compound having at least one hydrophilic substituent and at least a reactive functional group; and converting said at least a reactive functional group to a polymerizable functional group.

In yet another aspect, the present invention provides a method of making a hydrophilic polymeric composition having a high refractive index. The method comprises polymerizing a hydrophilic, aromatic-based monomer or polymerizing such a monomer and at least a different monomer.

In yet another aspect, an ophthalmic device comprises a polymeric material that comprises residues of at least a hydrophilic, aromatic-based monomer of the present invention.

Other features and advantages of the present invention will become apparent from the following detailed description and claims.

DETAILED DESCRIPTION OF THE INVENTION

In general, the present invention provides hydrophilic monomers having high refractive indices and polymeric compositions comprising such monomers. The polymeric compositions of the present invention have refractive index of about 1.4 or greater. In some embodiments, the refractive index is in the range from about 1.4 to about 1.7. In some other embodiments, the refractive index is in the range from about 1.45 to about 1.6.

In one aspect, a polymeric composition of the present invention has an equilibrium water content of greater than about 4.5 percent (by weight), thus avoiding problems related to the formation of water vacuoles. In addition, a polymeric composition of the present invention can have a relatively high elongation, such as about 80 percent or greater. Accordingly, in many aspects, the subject polymeric compositions are more suitable for use in the manufacture of ophthalmic devices than many prior-art polymeric materials.

Current commercial acrylic-based ophthalmic products have a water content less than 4.5 percent by weight. These hydrophobic products tend to absorb water over time in vivo and form water vacuoles or "glistenings." In contrast, a polymeric composition comprising residues of hydrophilic monomers of the present invention tend to absorb water rapidly to equilibrium level. Although, applicants do not wish to be bound to any particular theory, it is believed that the absorbed water also is distributed throughout the polymeric composition because of its association with the hydrophilic substituents in the aromatic groups. Therefore, polymeric compositions of the present invention do not present the risk of formation of water vacuoles in vivo.

A hydrophilic aromatic-based monomer of the present invention has a formula of $$G\text{-}D\text{-}Ar \qquad (I)$$

wherein Ar is a $C_6$-$C_{24}$ aromatic group having at least a hydrophilic substituent, D is a divalent linking group, and G is a reactive functional group. The term "$C_6$-$C_{24}$ aromatic group" means the aromatic group having 6-24 carbon atoms, excluding any carbon atoms in the substituent group.

In one embodiment, Ar is a phenyl group having at least a hydrophilic substituent.

In another embodiment, at least a hydrophilic substituent on the aromatic group is selected from the group consisting of carboxy, alcohols (including monohydric and polyhydric alcohols), and combinations thereof.

In another embodiment, at least a hydrophilic substituent on the aromatic group is selected from the group consisting of —COOH, —CH$_2$—CH$_2$OH, —(CHOH)$_2$—CH$_2$OH, —CH$_2$—CHOH—CH$_2$OH, and combinations thereof.

In still another embodiment, at least a hydrophilic substituent on the aromatic group is a poly(alkylene glycol), such as poly(ethylene glycol) having a formula of —(O—CH$_2$—CH$_2$)$_n$OH, wherein n is an integer and $1 \leq n \leq 100$, preferably $1 \leq n \leq 50$, and more preferably, $1 \leq n \leq 20$.

In a further embodiment, said hydrophilic substituent is selected from the group consisting of carboxamide, dialkyl-substituted carboxamide, amino, alkanolamino, sulfonate, phosphonate, sulfate, phosphate, ureido, substituted sugars, and combinations thereof.

In another aspect, G is a reactive functional group selected from the group consisting of vinyl, allyl, acryloyl, acryloyloxy, methacryloyl, methacryloyloxy, epoxide, isocyanate, isothiocyanate, amino, hydroxyl, mercapto, anhydride, carboxylic, fumaryl, styryl, and combinations thereof.

In another aspect, G is selected from the group consisting of vinyl, styryl, acryloyloxy, and methacryloyloxy.

In another aspect, D is a divalent group selected from the group consisting of saturated straight $C_1$-$C_{10}$ hydrocarbons, unsaturated straight $C_1$-$C_{10}$ hydrocarbons, saturated branched $C_3$-$C_{10}$ hydrocarbons, unsaturated branched $C_3$-$C_{10}$ hydrocarbons, saturated cyclic $C_3$-$C_{10}$ hydrocarbons, unsaturated cyclic $C_3$-$C_{10}$ hydrocarbons, and alkyloxy substituents. Preferably, D is a saturated straight $C_1$-$C_{10}$ hydrocarbon divalent group.

In one embodiment, a hydrophilic aromatic-based monomer of the present invention has a formula

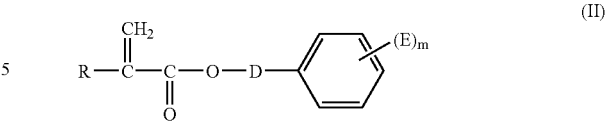

(II)

wherein R is hydrogen or CH$_3$; D is a divalent group selected from the group consisting of saturated straight $C_1$-$C_{10}$ hydrocarbons, unsaturated straight $C_1$-$C_{10}$ hydrocarbons, saturated branched $C_3$-$C_{10}$ hydrocarbons, unsaturated branched $C_3$-$C_{10}$ hydrocarbons, saturated cyclic $C_3$-$C_{10}$ hydrocarbons, unsaturated $C_3$-$C_{10}$ hydrocarbons, and alkoxy substituents; E is selected from the group consisting of carboxy, carboxamide, and alcohol (including monohydric and polyhydric alcohols) substituents; and m is an integer from 1 to, and including, 5. Preferably, m is 1 or 2.

In one embodiment, a hydrophilic aromatic-based monomer of the present invention has a formula

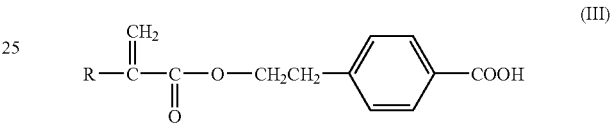

(III)

wherein R is either hydrogen or CH$_3$.

In another embodiment, a hydrophilic aromatic-based monomer of the present invention has a formula

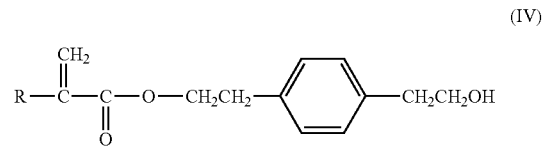

(IV)

wherein R is hydrogen or CH$_3$.

In still another embodiment, a hydrophilic aromatic-based monomer of the present invention has a formula

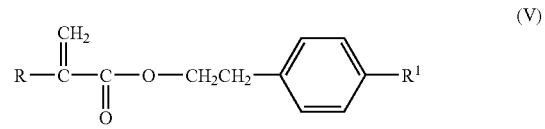

(V)

wherein R$^1$ is —C(O)O—NH$_2$ or —C(O)—N(CH$_3$)$_2$.

Hydrophilic, aromatic-based monomers of the present invention can be used to produce homopolymers or copolymers having high refractive indices, such as about 1.4 or greater. In some embodiments, the homopolymers or copolymers have refractive indices in the range from about 1.4 to about 1.7; in some other embodiments, from about 1.45 to about 1.6.

Alternatively, a hydrophilic, aromatic-based monomer of the present invention can be copolymerized with another hydrophilic or hydrophobic monomer to provide a polymer having high refractive index, such as about 1.4 or greater.

Non-limiting examples of other hydrophilic monomers useful for polymerization with one or more hydrophilic, aromatic-based monomers of the present invention include N,N-dimethylacrylamide, glycerol methacrylate, N-vinylpyrrolidone, and 2-hydroxyethyl methacrylate. Preferably, N,N-dimethylacrylamide is used for increased hydrophilicity.

Non-limiting examples of other hydrophobic monomers useful for polymerization with one or more hydrophilic, aromatic-based monomers of the present invention include $C_1$-$C_{10}$ alkyl methacrylates (e.g., methyl methacrylate, ethyl methacrylate, propyl methacrylate, butyl methacrylate, octyl methacrylate, or 2-ethylhexyl methacrylate; preferably, methyl methacrylate to control mechanical properties), $C_1$-$C_{10}$ alkyl acrylates (e.g., methyl acrylate, ethyl acrylate, propyl acrylate, or hexyl acrylate; preferably, ethyl acrylate to control mechanical properties), $C_6$-$C_{40}$ arylalkyl acrylates (e.g., phenylethyl acrylate, benzyl acrylate, 3-phenylpropyl acrylate, 4-phenylbutyl acrylate, 5-phenylpentyl acrylate, 8-phenyloctyl acrylate, or 2-phenylethoxy acrylate; preferably, 2-phenylethyl acrylate to increase refractive index), and $C_6$-$C_{40}$ arylalkyl methacrylates (e.g., 2-phenylethyl methacrylate, 3-phenylpropyl methacrylate, 4-phenylbutyl methacrylate, 5-phenylpentyl methacrylate, 8-phenyloctyl methacrylate, 2-phenoxyethyl methacrylate, 3,3-diphenylpropyl methacrylate, 2-(1-naphthylethyl) methacrylate, benzyl methacrylate, or 2-(2-naphthylethyl) methacrylate; preferably, phenylethyl methacrylate to increase refractive index). Other suitable hydrophobic monomers include silicon-containing monomers, especially aromatic-based silicon-containing monomer, such as 3-methacryloyloxypropyldiphenylmethylsilane.

The hydrophilic, aromatic-based monomer having Formula (III) can be produced by a method illustrated in Scheme 1.

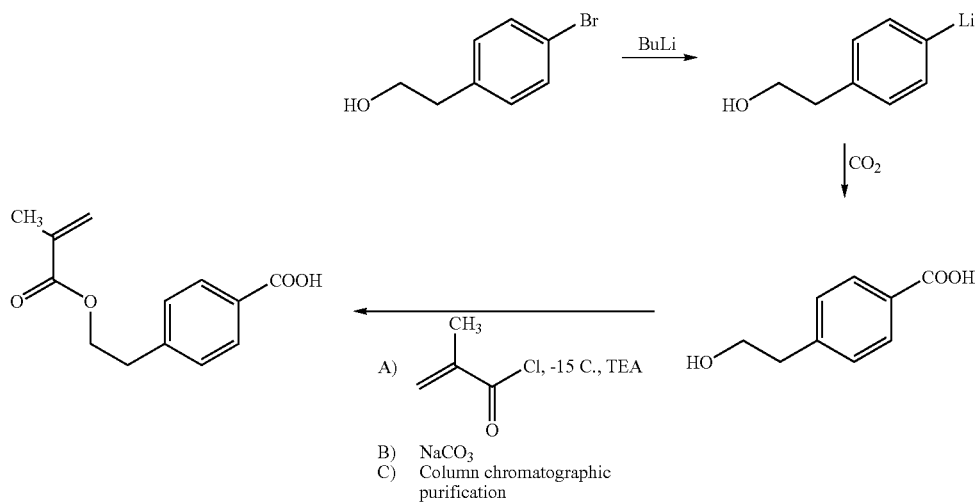

The hydrophilic, aromatic-based monomer having Formula (IV) can be produced by a method illustrated in Scheme 2.

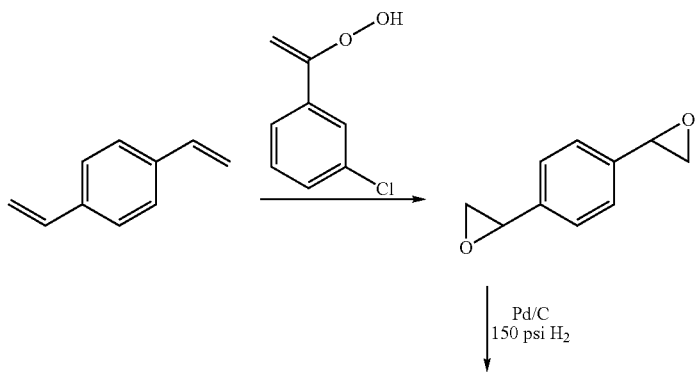

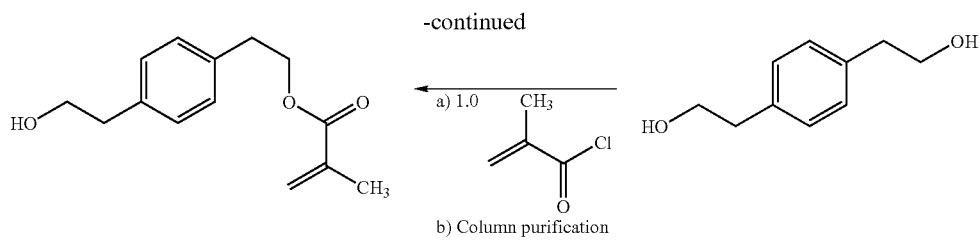

Homopolymers of hydrophilic, aromatic-based monomers of the present invention and copolymers comprising one or more hydrophilic, aromatic-based monomers of the present invention and at least another monomer can be produced by free radical polymerization. For example, a copolymer of the hydrophilic, aromatic-based monomer having Formula (III) and 2-phenylethyl methacrylate (or 2-phenylethyl acrylate) is produced according to the following reaction, in the presence of a thermal polymerization initiator (such as one selected from the list of thermal polymerization initiators disclosed below) at a temperature in the range from about 20° C. to about 120° C. Alternatively, the reaction can be carried out in the presence of a photoinitiator selected from the list of photoinitiators disclosed below at a temperature in the range from about 20° C. to about 60° C.

of a photoinitiator selected from the list of photoinitiators disclosed below at a temperature in the range from about 20° C. to about 60° C.

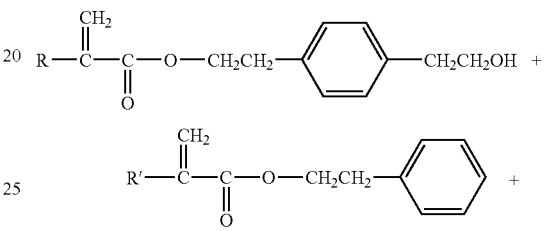

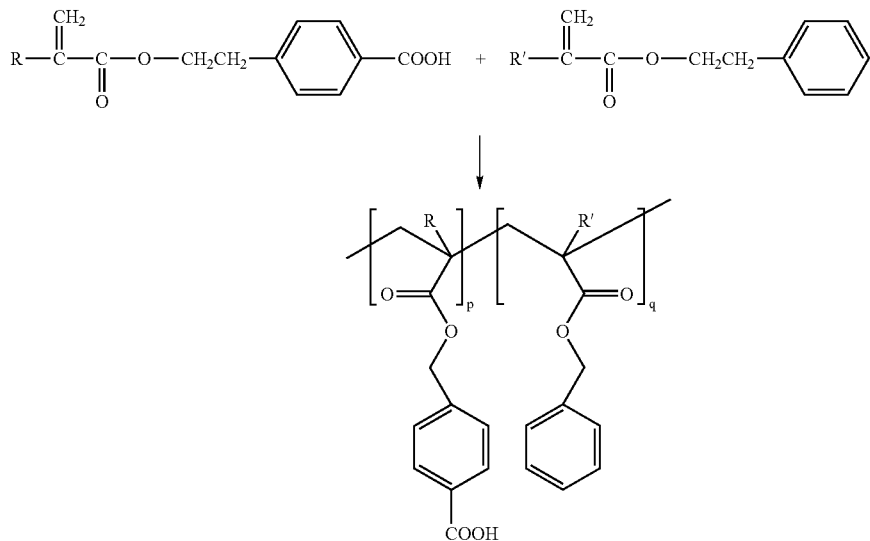

wherein R and R' are independently selected from the group consisting of hydrogen and $CH_3$; p and q are independently selected integers greater than 1 to provide a desired molar ratio of the monomers and a desired molecular weight. For example, p and q can be in the range from about 1 to about 100,000, or from 1 to about 50,000, or from 1 to 20,000.

Another exemplary copolymer comprising the monomer having Formula (IV); N,N-dimethylacrylamide; and phenylethyl methacrylate (or phenylethyl acrylate) is made according to the following reaction, in the presence of a thermal polymerization initiator (such as one selected from the list of thermal polymerization initiators disclosed below) at a temperature in the range from about 20° C. to about 120° C. Alternatively, the reaction can be carried out in the presence -continued

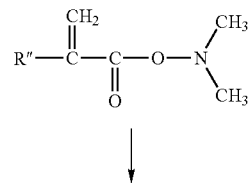

-continued

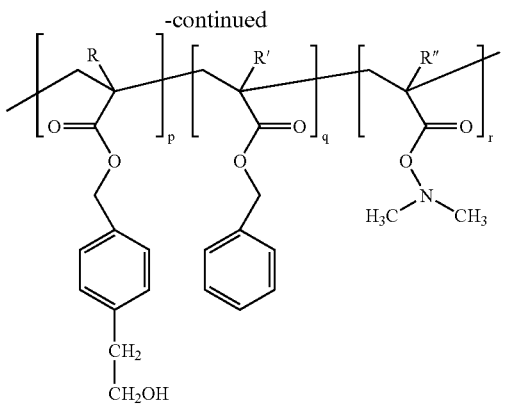

wherein R, R', and R" are independently selected from the group consisting of hydrogen and CH₃; p, q, and r are independently selected integers greater than 1 to provide a desired molar ratio of the monomers and a desired molecular weight. For example, p, q, and r can be in the range from about 1 to about 100,000, or from 1 to about 50,000, or from 1 to 20,000.

A formulation for the production of a polymer comprising a hydrophilic, aromatic-based monomer of the present invention can include one or more crosslinking agents in an amount less than about 10 percent by weight of the weight of all monomers and crosslinking agents, if desired. In one embodiment, the crosslinking agents are present in an amount less than about 5 percent by weight.

Non-limiting examples of suitable crosslinking agents include ethylene glycol dimethacrylate ("EGDMA"); diethylene glycol dimethacrylate; ethylene glycol diacrylate; triethylene glycol dimethacrylate; triethylene diacrylate; allyl methacrylates; allyl acrylates; 1,3-propanediol dimethacrylate; 1,3-propanediol diacrylate; 1,6-hexanediol dimethacrylate; 1,6-hexanediol diacrylate; 1,4-butanediol dimethacrylate; 1,4-butanediol diacrylate; trimethylolpropane trimethacrylate ("TMPTMA"); glycerol trimethacrylate; poly(ethyleneoxide mono-and di-acrylate); N,N'-dihydroxyethylene bisacrylamide; diallyl phthalate; triallyl cyanurate; divinylbenzene; ethylene glycol divinyl ether; N,N-methylene-bis-(meth)acrylamide; divinylbenzene; divinylsulfone; and the like.

Although not required, homopolymers or copolymers within the scope of the present invention may optionally have one or more strengthening agents added prior to polymerization, preferably in quantities of less than about 80 weight percent but more typically from about 20 to about 60 weight percent. Non-limiting examples of suitable strengthening agents are described in U.S. Pat. Nos. 4,327,203; 4,355,147; and 5,270,418; each of which is incorporated herein in its entirety by reference. Specific examples, not intended to be limiting, of such strengthening agents include cycloalkyl acrylates and methacrylates; e.g., tert-butylcyclohexyl methacrylate and isopropylcyclopentyl acrylate.

One or more ultraviolet ("UV") light absorbers may optionally be added to the copolymers prior to polymerization in quantities less than about 5 percent by weight. Suitable UV light absorbers for use in the present invention include for example, but are not limited to, β-(4-benzotriazoyl-3-hydroxyphenoxy)ethyl acrylate; 4-(2-acryloxyethoxy)-2-hydroxybenzophenone; 4-methacryloyloxy-2-hydroxybenzophenone; 2-(2'-methacryloyloxy-5'-methylphenyl) benzotriazole; 2-(2'-hydroxy-5'-methacryloxyethylphenyl )-2H-benzotriazole; 2-[3'-tert-butyl-2'-hydroxy-5'-(3"-methacryloyloxypropyl)phenyl]-5-chlorobenzotriazole; 2-(3'-tert-butyl-5'-(3"-dimethylvinylsilylpropoxy)-2'-hydroxyphenyl]-5-methoxybenzotriazole; 2-(3'-allyl-2'-hydroxy-5'-methylphenyl)benzotriazole; 2-[3'-tert-butyl-2'-hydroxy-5'-(3"-methacryloyloxypropoxy)phenyl]-5-methoxybenzotriazole, and 2-[3'-tert-butyl-2'-hydroxy-5'-(3"-methacryloyloxypropoxy)phenyl]-5-chlorobenzotriazole. Preferably, the UV light absorber also has a polymerizable functional group. In one embodiment, the preferred UV light absorbers are β-(4-benzotriazoyl-3-hydroxyphenoxy)ethyl acrylate and 2-[3'-tert-butyl-2'-hydroxy-5'-(3"-methacryloyloxypropoxy)phenyl]-5-chlorobenzotriazole.

One or more suitable free radical polymerization initiators may be desirably added to the copolymers of the present invention. These initiators include thermal polymerization initiators and photopolymerization initiators. Thermal polymerization initiators include organic peroxy compounds and azobis(organonitrile) compounds. Non-limiting examples of suitable organic peroxy compounds include peroxymonocarbonate esters, such as tert-butylperoxy isopropyl carbonate; peroxydicarbonate esters, such as di(2-ethylhexyl) peroxydicarbonate, di(sec-butyl)peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide. Non-limiting examples of suitable azobis(organonitrile) compounds include azobis (isobutyronitrile); 2,2'-azobis(2,4-dimethylpentanenitrile); 1,1'-azobiscyclohexanecarbonitrile; and azobis(2,4-dimethylvaleronitrile); and mixtures thereof. Preferably, such an initiator is employed in a concentration of approximately 0.01 to 1 percent by weight of the total monomer mixture.

Representative UV photopolymerization initiators include those known in the field, such as the classes of benzophenone and its derivatives, benzoin ethers, and phosphine oxides. Some non-limiting examples of these initiators are benzophenone; 4,4'-bis(dimethylamino)benzophenone; 4,4'-dihydroxybenzophenone; 2,2-diethoxyacetophenone; 2,2-dimethoxy-2-phenylacetophenone; 4-(dimethylamino) benzophenone; 2,5-dimethylbenzophenone; 3,4-dimethybenzophenone; 4'-ethoxyacetophenone; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; 4'-phenoxyacetophenone; 2-methyl-4'-(methylthio)-2-morpholinopropiophenone; benzoin methyl ether; benzoin ethyl ether; diphenyl(2,4,6-trimethylbenzoyl)phosphine oxide. These initiators are commercially available. Other photo polymerization initiators are known under the trade names Darocur™ and Irgacure™, such as Darocur™ 1173 (2-hydroxy-2-methyl-1-phenyl-1-propanone), Irgacure™ 651 (2,2-dimethoxy-2-phenylacetophenone), Irgacure™ 819 (phenyl-bis(2,4,6-trimethyl benzoyl)phosphine oxide), and Irgacure™ 184 (1-hydroxy cyclohexyl phenyl ketone) from Ciba-Geigy, Basel, Switzerland.

The polymeric compositions of the present invention are transparent, flexible, of relatively high refractive index and of relatively high elongation. The polymeric compositions of the present invention with the desirable physical properties noted above are particularly useful in the manufacture of ophthalmic devices such as but not limited to relatively thin, foldable IOLs, contact lenses, corneal rings, corneal inlays, and keratoprostheses. Furthermore, absorbed water in the polymeric compositions of the present invention does not tend to form water vacuoles. Thus, the polymeric compositions of the present invention are more advantageously used in ophthalmic device applications than prior-art acrylic compositions.

IOLs having relatively thin optic portions are critical in enabling a surgeon to minimize surgical incision size. Keeping the surgical incision size to a minimum reduces intraoperative trauma and postoperative complications. A relatively thin IOL optic portion is also critical for accommodating certain anatomical locations in the eye such as the anterior chamber and the ciliary sulcus. IOLs may be placed in the anterior chamber for increasing visual acuity in either aphakic or phakic eyes, or placed in the ciliary sulcus for increasing visual acuity in phakic eyes.

The polymeric compositions of the present invention have the flexibility required to allow implants manufactured from the same to be folded or deformed for insertion into an eye through the smallest possible surgical incision, i.e., 3.5 mm or smaller.

In general, a method of making an ophthalmic device comprises: (a) providing a polymerizable composition comprising a hydrophilic, aromatic-based monomer of the present invention; and (b) curing the polymerizable composition at a temperature and for a time sufficient to produce the ophthalmic device. The curing can be carried out such that the polymerizable composition is solidified into the final form of the ophthalmic device or such that a solid article is first produced and the ophthalmic device is shaped therefrom.

In one embodiment, the method of making an ophthalmic device comprises: (a) providing a polymerizable composition comprising a hydrophilic, aromatic-based monomer; (b) disposing the polymerizable composition in a mold cavity, which forms a shape of the ophthalmic device; and (c) curing the polymerizable composition under a condition and for a time sufficient to form the ophthalmic device; wherein the hydrophilic, aromatic-based monomer has a formula of

G-D-Ar        (I)

wherein Ar is a $C_6$-$C_{24}$ aromatic group having at least a hydrophilic substituent, D is a divalent linking group, and G is a reactive functional group.

In one embodiment, at least a hydrophilic substituent on the aromatic group is selected from the group consisting of carboxy, carboxamide, alcohol (including monohydric and polyhydric alcohols) substituents, and combinations thereof.

In another embodiment, at least a hydrophilic substituent on the aromatic group is selected from the group consisting of —COOH, —$CH_2$—$CH_2OH$, —$(CHOH)_2$—$CH_2OH$, —$CH_2$—CHOH—$CH_2OH$, and combinations thereof.

In still another embodiment, at least a hydrophilic substituent on the aromatic group is a poly(alkylene glycol), such as poly(ethylene glycol) having a formula of —(O—$CH_2$—$CH_2)_n$OH, wherein n is an integer and $1 \leq n \leq 100$, preferably $1 \leq n \leq 50$, and more preferably, $1 \leq n \leq 20$.

In a further embodiment, said hydrophilic substituent is selected from the group consisting of carboxamide, dialkyl-substituted carboxamide, amino, alkanolamino, sulfonate, phosphonate, sulfate, phosphate, ureido, substituted sugars, and combinations thereof.

In yet another embodiment, the polymerizable composition also comprises a crosslinking agent, or a polymerization initiator, or both. The polymerization initiator is preferably a thermal polymerization initiator. The curing can be carried out at an elevated temperature such as in the range from about ambient temperature to about 120° C. In some embodiments, the curing is carried out at a temperature from slightly higher than ambient temperature to about 100° C. A time from about 1 minute to about 48 hours is typically adequate for the curing.

In another embodiment, the method of making an ophthalmic device comprises: (a) providing polymerizable composition comprising a hydrophilic, aromatic-based monomer; (b) casting the polymerizable composition under a condition and for a time sufficient to form a solid block; and (c) shaping the block into the ophthalmic device; wherein the hydrophilic, aromatic-based monomer has a formula of

G-D-Ar        (I)

wherein Ar is a $C_6$-$C_{24}$ aromatic group having at least a hydrophilic substituent, D is a divalent linking group, and G is a reactive functional group.

In one embodiment, said at least a hydrophilic substituent is selected from the group consisting of carboxy, alcohols (including monohydric and polyhydric alcohols), and combinations thereof.

In another embodiment, at least a hydrophilic substituent on the aromatic group is selected from the group consisting of —COOH, —$CH_2$—$CH_2OH$, —$(CHOH)_2$—$CH_2OH$, —$CH_2$—CHOH—$CH_2OH$, and combinations thereof.

In still another embodiment, at least a hydrophilic substituent on the aromatic group is a poly(alkylene glycol), such as poly(ethylene glycol) having a formula of —(O—$CH_2$—$CH_2)_n$OH, wherein n is an integer and $1 \leq n \leq 100$, preferably $1 \leq n \leq 50$, and more preferably, $1 \leq n \leq 20$.

In a further embodiment, said hydrophilic substituent is selected from the group consisting of carboxamide, dialkyl-substituted carboxamide, amino, alkanolamino, sulfonate, phosphonate, sulfate, phosphate, ureido, substituted sugars, and combinations thereof.

In yet another embodiment, the polymerizable composition also comprises a crosslinking agent, or a polymerization initiator, or both. The polymerization initiator is preferably a thermal polymerization initiator. The casting can be carried out at an elevated temperature such as in the range from about 20° C. to about 120° C. In some embodiments, the casting is carried out at a temperature from slightly higher than ambient temperature to about 100° C. A time from about 1 minute to about 48 hours is typically adequate for the polymerization. The shaping can comprise cutting the solid block into wafers, and lathing or machining the wafers into the shape of the final ophthalmic device.

Ophthalmic medical devices manufactured using polymeric compositions of the present invention are used as customary in the field of ophthalmology. For example, in a surgical cataract procedure, an incision is placed in the cornea of an eye. Through the corneal incision the cataractous natural lens of the eye is removed (aphakic application) and an IOL is inserted into the anterior chamber, posterior chamber or lens capsule of the eye prior to closing the incision. However, the subject ophthalmic devices may likewise be used in accordance with other surgical procedures known to those skilled in the field of ophthalmology.

While specific embodiments of the present invention have been described in the foregoing, it will be appreciated by those skilled in the art that many equivalents, modifications, substitutions, and variations may be made thereto without departing from the spirit and scope of the invention as defined in the appended claims.

What is claimed is:

1. An ophthalmic device comprising a polymeric composition that comprises residues of a hydrophilic, aromatic-based monomer having a formula of

wherein Ar is a $C_6$-$C_{24}$ aromatic group having a hydrophilic substituent selected from the group consisting of —COOH, —CH$_2$—CH$_2$OH, —(CHOH)$_2$—CH$_2$OH, —CH$_2$—CHOH—CH$_2$OH, poly(alkylene glycol), —C(O)O—NH$_2$, —C(O)—N(CH$_3$)$_2$, and combinations thereof, D is a divalent linking group, and G is a reactive functional group.

2. The ophthalmic device of claim 1, wherein said poly(alkylene glycol) is poly(ethylene glycol) having a formula of —(O—CH$_2$—CH$_2$)$_n$OH, wherein n is an integer and $1 \leq n \leq 50$.

3. The ophthalmic device of claim 1, wherein the hydrophilic, aromatic-based monomer has a formula of

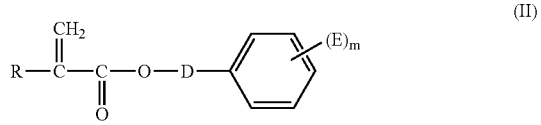

wherein R is hydrogen or CH$_3$; D is a divalent group selected from the group consisting of saturated straight $C_1$-$C_{10}$ hydrocarbons, unsaturated straight $C_1$-$C_{10}$ hydrocarbons, saturated branched $C_3$-$C_{10}$ hydrocarbons, unsaturated branched $C_3$-$C_{10}$ hydrocarbons, saturated cyclic $C_3$-$C_{10}$ hydrocarbons, unsaturated cyclic $C_3$-$C_{10}$ hydrocarbons, and alkoxy substituents; E is selected from the group consisting of carboxy, carboxamide, and monohydric and polyhydric alcohol substituents; and m is an integer from 1 to, and including, 5.

4. The ophthalmic device of claim 1, wherein the hydrophilic, aromatic-based monomer has a formula of

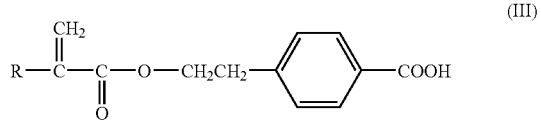

wherein R is hydrogen or CH$_3$.

5. The ophthalmic device of claim 1, wherein the hydrophilic, aromatic-based monomer has a formula of

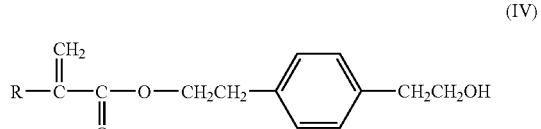

wherein R is hydrogen or CH$_3$.

6. The ophthalmic device of claim 1, wherein the hydrophilic, aromatic-based monomer has a formula of

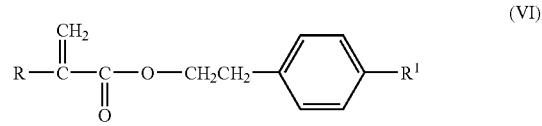

wherein R is hydrogen or CH$_3$, and R$^1$ is —C(O)O—NH$_2$ or —C(O)—N(CH$_3$)$_2$.

7. The ophthalmic device of claim 1, wherein the polymeric composition further comprises units of at least one additional monomer selected from the group consisting of hydrophilic monomers other than said hydrophilic, aromatic-based monomer; hydrophobic monomers; and combinations thereof.

8. The ophthalmic device of claim 7, wherein the additional monomer is selected from the group consisting of N,N-dimethylacrylamide, glycerol methacrylate, N-vinylpyrrolidone, and 2-hydroxyethyl methacrylate.

9. The ophthalmic device of claim 7, wherein the additional monomer is selected from the group consisting of $C_1$-$C_{10}$ alkyl methacrylates, $C_1$-$C_{10}$ alkyl acrylates, $C_6$-$C_{40}$ arylalkyl acrylates, $C_6$-$C_{40}$ arylalkyl methacrylates, and aromatic-based silicon-containing monomers.

10. The ophthalmic device of claim 7, wherein the additional monomer is N,N-dimethylacrylamide.

11. The ophthalmic device of claim 7, wherein the additional monomer is selected from the group consisting of 2-phenylethyl acrylate, 2-phenylethyl methacrylate, and combinations thereof.

12. The ophthalmic device of claim 1, wherein the polymeric composition further comprises a UV light absorber selected from the group consisting of β-(4-benzotriazoyl-3-hydroxyphenoxy)ethyl acrylate; 4-(2-acryloxyethoxy)-2-hydroxybenzophenone; 4-methacryloyloxy-2-hydroxybenzophenone; 2-(2'-methacryloyloxy-5'-methylphenyl)benzotriazole; 2-(2'-hydroxy-5'-methacryoxyethylphenyl)-2H-benzotriazole; 2-[3'-tert-butyl-2'-hydroxy-5'-(3"-(methacryloyloxypropyl)phenyl]-5-chlorobenzotriazole; 2-(3'-tert-butyl-5'-(3"-dimethylvinylsilylpropoxy)-2'-hydroxyphenyl]-5-methoxybenzotriazole; 2-(3'-allyl-2'-hydroxy-5'-methylphenyl)benzotriazole; 2-[3'-tert-butyl-2'-hydroxy-5'-(3"-methacryloyloxypropoxy)phenyl]-5-methoxybenzotriazole, and 2-[3'-tert-butyl-2'-hydroxy-5'-(3"-methacryloyloxypropoxy)phenyl]5-chlorobenzotriazole.

13. The ophthalmic device of claim 1, wherein the polymeric composition has a refractive index in a range from about 1.4 to about 1.7.

14. The ophthalmic device of claim 13, wherein the polymeric composition has equilibrium absorbed water greater than about 4.5 percent by weight.

15. The ophthalmic device of claim 14, wherein the polymeric composition has an elongation before break of greater than about 80 percent.

16. The ophthalmic device of claim 14, wherein the ophthalmic device is selected from the group consisting of intraocular lenses, contact lenses, corneal rings, corneal inlays, and keratoprostheses.

* * * * *